US012586527B2

(12) United States Patent
Huh et al.

(10) Patent No.: US 12,586,527 B2
(45) Date of Patent: Mar. 24, 2026

(54) PIXEL DRIVING CIRCUIT, DISPLAY DEVICE INCLUDING THE SAME, AND METHOD FOR DRIVING THE DISPLAY DEVICE

(71) Applicant: SAMSUNG DISPLAY CO., LTD., Yongin-si (KR)

(72) Inventors: Joon Huh, Yongin-si (KR); Jaehoon Lee, Yongin-si (KR); Ohchul Kwon, Yongin-si (KR); Byung Kwan Song, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/915,479

(22) Filed: Oct. 15, 2024

(65) Prior Publication Data

US 2025/0252916 A1 Aug. 7, 2025

(30) Foreign Application Priority Data

Feb. 1, 2024 (KR) ........................ 10-2024-0016166

(51) Int. Cl.
*H01L 27/32* (2006.01)
*G09G 3/32* (2016.01)
*G09G 3/3233* (2016.01)

(52) U.S. Cl.
CPC ............. *G09G 3/3233* (2013.01); *G09G 3/32* (2013.01); *G09G 2320/0247* (2013.01); *G09G 2330/021* (2013.01)

(58) Field of Classification Search
CPC ................... G09G 3/3233; G09G 3/32; G09G 2320/0247; G09G 2330/021; G09G 3/325
See application file for complete search history.

(56) References Cited

U.S. PATENT DOCUMENTS 9,886,908 B2 2/2018 Tani et al.
10,324,324 B2 6/2019 Kim et al.
11,869,402 B2 1/2024 Gai et al.
2017/0061878 A1* 3/2017 Park .................... G09G 3/3233
(Continued)

FOREIGN PATENT DOCUMENTS

CN 113808532 A 12/2021
KR 10-2017-0003841 A 1/2017
(Continued)

*Primary Examiner* — Abdul-Samad A Adediran
(74) *Attorney, Agent, or Firm* — F. CHAU & ASSOCIATES, LLC

(57) ABSTRACT

A display device including: a pixel driving circuit that includes: a first transistor including a gate electrode connected to a first node, a first electrode connected to a first voltage, and a second electrode connected to a second node; a second transistor including a gate electrode connected to a first scan line, a first electrode connected to a data line, and a second electrode connected to the first node; a sixth transistor including a gate electrode connected to a second emission line, a first electrode connected to the second node, and a second electrode connected to a third node; and a fourth transistor including a gate electrode connected to a second scan line, a first electrode connected to the third node, and a second electrode connected to a second voltage, and a non-active period of the second emission control signal overlaps an active period of the second scan signal.

18 Claims, 9 Drawing Sheets

(56) References Cited

U.S. PATENT DOCUMENTS

| | | | | |
|---|---|---|---|---|
| 2022/0173189 | A1* | 6/2022 | Kim | G09G 3/325 |
| 2024/0021152 | A1 | 1/2024 | Wang et al. | |

FOREIGN PATENT DOCUMENTS

| | | | |
|---|---|---|---|
| KR | 10-2017-0043983 | A | 4/2017 |
| KR | 10-2019-0034729 | A | 4/2019 |
| KR | 10-2023-0017283 | A | 2/2023 |

* cited by examiner

PIXEL DRIVING CIRCUIT, DISPLAY DEVICE INCLUDING THE SAME, AND METHOD FOR DRIVING THE DISPLAY DEVICE

CROSS-REFERENCE TO RELATED APPLICATION

This application claims priority under 35 U.S.C. § 119 to Korean Patent Application No. 10-2024-0016166 filed on Feb. 1, 2024, in the Korean Intellectual Property Office, the disclosure of which is incorporated by reference herein in its entirety.

TECHNICAL FIELD

Embodiments of the present disclosure relate to a pixel driving circuit that can prevent the degradation of display quality. Additionally, this disclosure relates to a display device incorporating this circuit, and a method for driving the display device.

DISCUSSION OF RELATED ART

Various display devices, such as televisions (TVs), cellular phones, tablet computers, navigation systems, and game consoles, have been developed. Notably, because portable display devices are battery operated, there have been numerous efforts to reduce their power consumption.

One approach to reducing power consumption is to lower the operating frequency of a display device. For example, reducing the operating frequency when the device is displaying a still image can help decrease its power consumption.

There is a need for technology that reduces the power consumption of the display device, while maintaining high display quality.

SUMMARY

Embodiments of the present disclosure provide a pixel driving circuit that can prevent the degradation of display quality, a display device incorporating this circuit, and a method for driving the display device.

According to an embodiment of the present disclosure, there is provided a display device including: a display panel including a plurality of pixels; a driving controller configured to drive the plurality of pixels in units of a frame, wherein each of the plurality of pixels includes: a light emitting diode and a pixel driving circuit connected to the light emitting diode, wherein the pixel driving circuit includes: a first transistor including a gate electrode connected to a first node, a first electrode electrically connected to a first voltage line for applying a first driving voltage, and a second electrode connected to a second node; a second transistor including a gate electrode connected to a first scan line for applying a first scan signal, a first electrode connected to a data line, and a second electrode connected to the first node; a first capacitor connected between the first node and the second node; a sixth transistor including a gate electrode connected to a second emission line for applying a second emission control signal, a first electrode connected to the second node, and a second electrode connected to a third node; and a fourth transistor including a gate electrode connected to a second scan line for applying a second scan signal different from the first scan signal, a first electrode connected to the third node, and a second electrode connected to a second voltage line for applying an initialization voltage, wherein the frame includes a driving period and a scan period, and wherein a non-active period of the second emission control signal overlaps with an active period of the second scan signal during the scan period.

The pixel driving circuit further includes a fifth transistor including a gate electrode connected to a first emission line for applying a first emission control signal, a first electrode connected to the first voltage line, and a second electrode connected to the first electrode of the first transistor, and wherein the first emission control signal is in an active state during the scan period.

The pixel driving circuit further includes a third transistor including a gate electrode connected to a third scan line for applying a third scan signal different from the first scan signal and the second scan signal, a first electrode connected to a third voltage line for applying a reference voltage, and a second electrode connected to the first node.

The third scan signal is in a non-active state during the scan period.

The driving period includes an active period of the first scan signal.

A first width of the active period of the second scan signal is smaller than a second width of the non-active period of the second emission control signal during the scan period.

The active period of the second scan signal has a third width different from the first width during the driving period.

The non-active period of the second emission control signal during the driving period has a fourth width equal to the second width.

The first scan signal is in a non-active state during the scan period.

The active period of the second scan signal and the non-active period of the second emission control signal occur at the same time during the scan period.

A plurality of scan periods are included in the frame.

According to an embodiment of the present disclosure, there is provided a pixel driving circuit including: a first transistor including a gate electrode connected to a first node, a first electrode electrically connected to a first voltage line for applying a first driving voltage, and a second electrode connected to a second node; a second transistor including a gate electrode connected to a first scan line for applying a first scan signal, a first electrode connected to a data line, and a second electrode connected to the first node; a first capacitor connected between the first node and the second node; a sixth transistor including a gate electrode connected to a second emission line for applying a second emission control signal, a first electrode connected to the second node, and a second electrode connected to a third node; and a fourth transistor including a gate electrode connected to a second scan line for applying a second scan signal different form the first scan signal, a first electrode connected to the third node, and a second electrode connected to a second voltage line for applying an initialization voltage, and wherein a non-active period of the second emission control signal overlaps an active period of the second scan signal during the scan period in which a data voltage is held.

The pixel driving circuit further including a fifth transistor including a gate electrode connected to a second emission line for applying a second emission control signal, a first electrode connected to the first voltage line, and a second electrode connected to the first electrode of the first transistor, wherein the fifth transistor is in an active state during the scan period.

The pixel driving circuit further including a third transistor including a gate electrode connected to a third scan line for applying a third scan signal different from the first scan signal and the second scan signal, a first electrode connected to a third voltage line for applying a reference voltage, and a second electrode connected to the first node.

The third transistor is in a non-active state during the scan period.

A first width of the active period of the second scan signal is smaller than a second width of the non-active period of the second emission control signal during the scan period.

The second transistor is in a non-active state during the scan period.

According to an embodiment of the present disclosure, there is provided a method for driving a display device, which includes a display panel, which includes a driving controller, a light emitting diode and a pixel driving circuit including a driving transistor, a switching transistor to receive a data voltage, an initialization transistor connected to an initialization voltage line, a first light emitting transistor, and a second light emitting transistor, the method including: driving, by the driving controller, the display panel in units of a frame including a driving period and a scan period; maintaining the first light emitting transistor in a turned on state during the scan period; providing a first period, in which the second light emitting transistor is turned off, during the scan period; providing a second period, in which the initialization transistor is turned on, during a period in which the second light emitting transistor is turned off, and wherein the first period overlaps with the second period.

The first period overlaps the entire second period.

The method further includes: providing a third period, in which the switching transistor is turned on, during the driving period, and allowing the light emitting diode to emit light during the driving period.

A first width of the first period is greater than a second width of the second period.

A plurality of driving periods and a plurality of scan periods are alternately provided.

The method further includes maintaining the switching transistor in a turned off state during the scan period.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
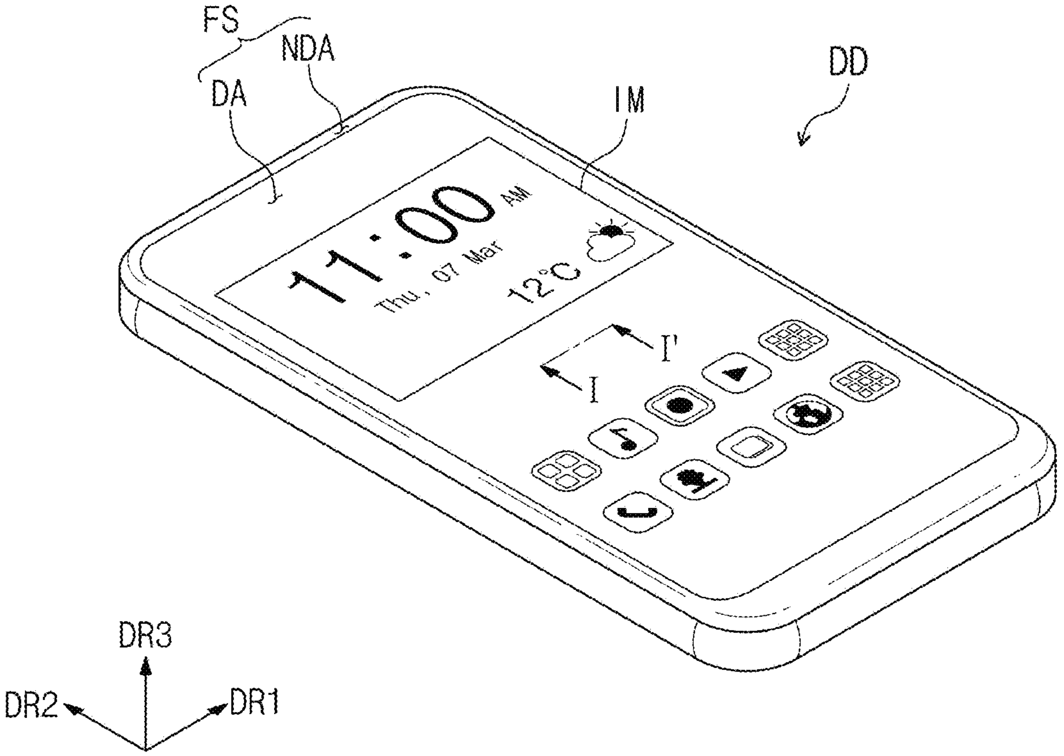
FIG. 1 is a perspective view of a display device according to an embodiment of the present disclosure.

In the specification, the expression that a first component (or region, layer, part, portion, etc.) is "on", "connected to", or "coupled to" a second component means that the first component is directly on, connected to, or coupled to the second component, or that a third component is interposed between them.

The same reference numeral will be assigned to the same component. In addition, in the drawings, thicknesses, proportions, and dimensions of components may be exaggerated to effectively describe the technical features. The terminology "and/or" includes any and all combinations of one or more of the associated components Although the terminology "first", "second", etc. may be used to describe various components, these terms should not be construed as limiting. The terminology is only used to distinguish one component from another. For example, a first component may be referred to as a second component, and similarly, the second component may be referred to as the first component. The singular forms are intended to include the plural forms unless the context clearly indicates otherwise.

In addition, the terminology "under", "at a lower portion", "above" and "an upper portion" are used to describe the relationship between components illustrated in the drawings. This terminology is relative and described with reference to the direction indicated in the drawing.

It will be further understood that the terms "comprises," "comprising," "includes" "including" or "having" specify the presence of stated features, numbers, steps, operations, components, parts, or the combination thereof, but do not preclude the presence or addition of one or more other features, numbers, steps, operations, components, and/or combinations thereof.

Unless otherwise defined, all terms (including technical terms and scientific terms) used in the specification have the same meaning as commonly understood by one skilled in the art to which the present disclosure belongs. Furthermore, terms defined in commonly used dictionaries should be interpreted as having meanings consistent with their context within the related technology, and should not be interpreted in an ideal or overly formal sense unless explicitly defined herein.

Hereinafter, embodiments of the present disclosure will be described with reference to the accompanying drawings.

FIG. 1 is a perspective view of a display device according to an embodiment of the present disclosure.

Referring to FIG. 1, according to an embodiment of the present disclosure, a display device DD may have a shape having a shorter side extending in a first direction DR1 and a longer side extending in a second direction DR2 crossing the first direction DR1. However, the shape of the display device DD is not limited thereto; various display devices DD with different shapes may be provided.

According to the present disclosure, the display device DD may include a large-size display device, such as a television or a monitor, or a small or medium-size display device, such as a cellular phone, a tablet, a vehicle navigation system, or a game console. These examples are provided for illustrative purposes only, and it is evident that the display device DD can be applied to other electronic devices without departing from the scope of the present disclosure.

As illustrated in FIG. 1, the display device DD may display an image IM, in a third direction DR3 crossing the first direction DR1 and the second direction DR2, on a display surface FS parallel to the first direction DR1 and the second direction DR2, respectively. The display surface FS on which the image IM is displayed may correspond to a front surface of the display device DD.

The display surface FS of the display device DD may be divided into a plurality of regions. The display surface FS of the display device DD may be divided into a display region DA and a non-display region NDA.

The display region DA is an area where the image IM is displayed. A user may view the image IM through the display region DA. The shape of the display region DA may be defined by the non-display region NDA. However, this structure is provided for illustrative purposes. For example, the non-display region NDA may be adjacent to only one side of the display region DA or may be omitted entirely. The display device DD according to an embodiment of the present disclosure may include various configurations, and the present disclosure is not limited to any specific embodiment.

The non-display region NDA, which is adjacent to the display region DA, is an area where the image IM is not displayed. A bezel region of the display device DD may be defined by the non-display region NDA.

The non-display region NDA may surround the display region DA. However, this structure is provided for illustrative purposes. For example, the non-display region NDA may be adjacent to only a portion of an edge of the display region DA, and is not limited to any specific embodiment.

Figure 2:
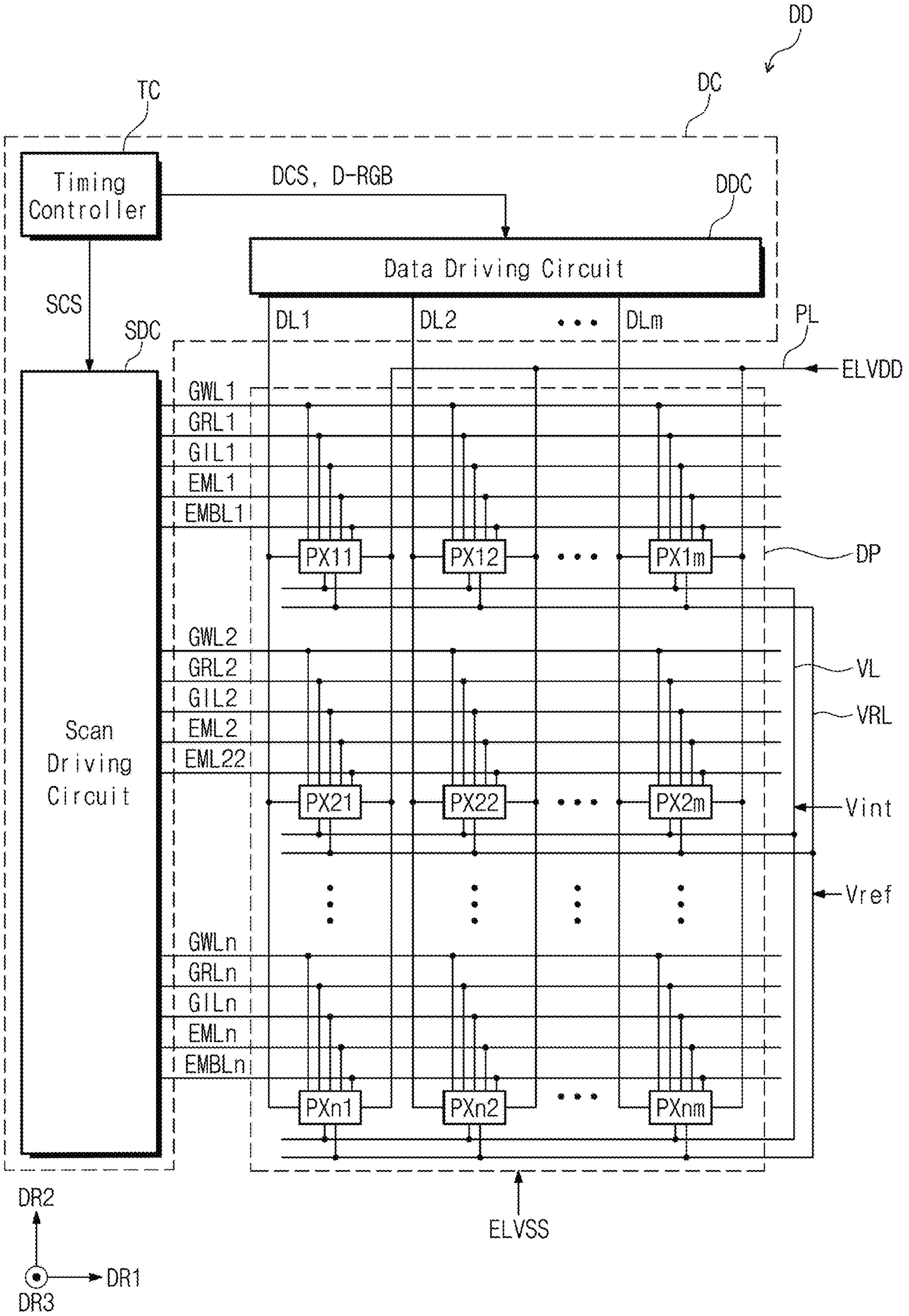
FIG. 2 is a block diagram of a display device according to an embodiment of the present disclosure.

FIG. 2 is a block diagram of a display device according to an embodiment of the present disclosure.

Referring to FIG. 2, the display device DD may include a display panel DP and a driving controller DC.

According to an embodiment of the present disclosure, the display panel DP may be an emissive-type display panel, though the present disclosure is not limited thereto. For example, the display panel DP may be an organic light emitting display panel, an inorganic light emitting display panel, a micro-light emitting diode (LED) display panel, or a nano-LED display panel. The light emitting layer of the organic light emitting display panel may include an organic light emitting material. The light emitting layer of the inorganic light emitting display panel may include a quantum dot, or a quantum rod. The light emitting layer of the micro-LED display panel may include a micro-LED. The light emitting layer of the nano-LED display layer may include a nano-LED. Hereinafter, the display panel DP is referred to as an organic light emitting display panel.

The driving controller DC may include a timing controller TC, a scan driving circuit SDC, and a data driving circuit DDC.

The timing controller TC may receive image signals and a control signal from an external source. The timing controller TC may transform the data format of the image signals to match the interface specification with the data driving circuit DDC to generate image data D-RGB. The timing controller TC may generate a scan control signal SCS and a data control signal DCS, by transforming a control signal. The timing controller TC outputs the image data D-RGB, the data control signal DCS, and the scan control signal SCS.

The scan driving circuit SDC may receive the scan control signal SCS from the timing controller TC. The scan control signal SCS may include a vertical start signal to initiate the operation of the scan driving circuit SDC and a clock signal to determine the output timing of signals. The scan driving circuit SDC may generate a plurality of first scan signals, a plurality of second scan signals, and a plurality of third scan signals. The scan driving circuit SDC may output the plurality of first scan signals to a plurality of first scan lines GWL1 to GWLn which correspond to the plurality of first scan signals, may output the plurality of second scan signals to a plurality of second scan lines GIL1 to GILn which correspond to the plurality of second scan signals, and may output the plurality of third scan signals to a plurality of third scan lines GRL1 to GRLn which correspond to the plurality of third scan signals.

The scan driving circuit SDC may generate a plurality of first emission control signals and a plurality of second emission control signals in response to the scan control signal SCS. The scan driving circuit SDC may output the plurality of first emission control signals to a plurality of first emission lines EML1 to EMLn which correspond to the plurality of first emission control signals, and may output the plurality of second emission control signals to a plurality of second emission lines EMBL1 to EMBLn which correspond to the plurality of second emission control signals.

Although FIG. 2 illustrates that the plurality of first to third scan signals and the plurality of first and second emission control signals are output from a single scan driving circuit SDC, the present disclosure is not limited thereto. According to an embodiment of the present disclosure, the display device DD may include a plurality of scan driving circuits SDC. This plurality of scan driving circuits SDC can output a plurality of scan driving signals in the form of first to third scan signals and first and second emission control signals. In addition, according to an embodiment of the present disclosure, the scan driving circuit SDC may include a driving circuit to generate and output the first to third scan signals and a driving circuit to generate and output the first and second emission control signals.

The data driving circuit DDC may receive the data control signal DCS and the image data D-RGB from the timing controller TC. The data driving circuit DDC may transform the image data D-RGB to data voltages, and may output the data voltages to a plurality of data lines DL1 to DLm to be described below. The data voltages may be analog voltages corresponding to the grayscale values of the image data D-RGB.

The display panel DP may include the first scan lines GWL1 to GWLn, the second scan lines GIL1 to GILn, the third scan lines GRL1 to GRLn, the first emission lines EML1 to EMLn, the second emission lines EMBL1 to EMBLn, data lines DL1 to DLm, a first voltage line PL, a second voltage line VL, a third voltage line VRL, and a plurality of pixels PX11 to PXnm. The first scan lines GWL1 to GWLn, the second scan lines GIL1 to GILn, the third scan lines GRL1 to GRLn, the first emission lines EML1 to EMLn, and the second emission lines EMBL1 to EMBLn may extend in the first direction DR1 and be arranged in the second direction DR2 crossing the first direction DR1.

The data lines DL1 to DLm may be insulated from the first scan lines GWL1 to GWLn, the second scan lines GIL1 to GILn, the third scan lines GRL1 to GRLn, the first emission lines EML1 to EMLn, and the second emission lines EMBL1 to EMBLn while crossing the first scan lines GWL1 to GWLn, the second scan lines GIL1 to GILn, the third scan lines GRL1 to GRLn, the first emission lines EML1 to EMLn, and the second emission lines EMBL1 to EMBLn. The plurality of pixels PX11 to PXnm may be connected to corresponding scan lines GWL1 to GWLn, GRL1 to GRLn, and GIL1 to GILn, among the scan lines GWL1 to GWLn, GRL1 to GRLn, and GIL1 to GILn. The connection relationship between the pixels PX11 to PXnm and the scan lines GWL1 to GWLn, GRL1 to GRLn, and GIL1 to GILn may vary depending on the configuration of the driving circuit of the plurality of pixels PX11 to PXnm.

The first voltage line PL may receive a first driving voltage ELVDD. The second voltage line VL may receive an initialization voltage Vint. The third voltage line VRL may receive a reference voltage Vref. The initialization voltage Vint may have a level lower than that of the first driving voltage ELVDD. A second driving voltage ELVSS may be applied to the display panel DP. The second driving voltage ELVSS may have a lower level than the first driving voltage ELVDD.

Although the display device DD has been described above with reference to FIG. 2, the display device DD according to an embodiment of the present disclosure is not limited to this configuration. The display device DD may include the scan lines GWL1 to GWLn, GIL1 to GILn, and GRL1 to GRLn, or these scan lines may be omitted. In addition, the connection relationship between each of the plurality of pixels PX11 to PXnm and the scan lines GWL1 to GWLn, GRL1 to GRLn, and GIL1 to GILn may vary.

The plurality of pixels PX11 to PXnm may include multiple groups of pixels, each including light emitting diodes OLED (see FIG. 3) that emit different colors of light. For example, these groups may include red pixels that emit red light, green pixels that emit green light, and blue pixels that emit blue light. The light emitting diodes of the red, green and blue pixels may include light emitting layers made from different materials.

Each of the plurality of pixels PX11 to PXnm may include a plurality of transistors and at least one capacitor electrically connected to the transistor. The details thereof will be described later. At least one of the scan driving circuit SDC and the data driving circuit DDC may include a plurality of transistors formed through the same process as the pixel driving circuit.

The above-described scan lines GWL1 to GWLn, GIL1 to GILn, and GRL1 to GRLn, the plurality of pixels PX11 to PXnm, the scan driving circuit SDC, and the data driving circuit DDC may be formed on a base substrate through a plurality of photolithography processes.

Figure 3:
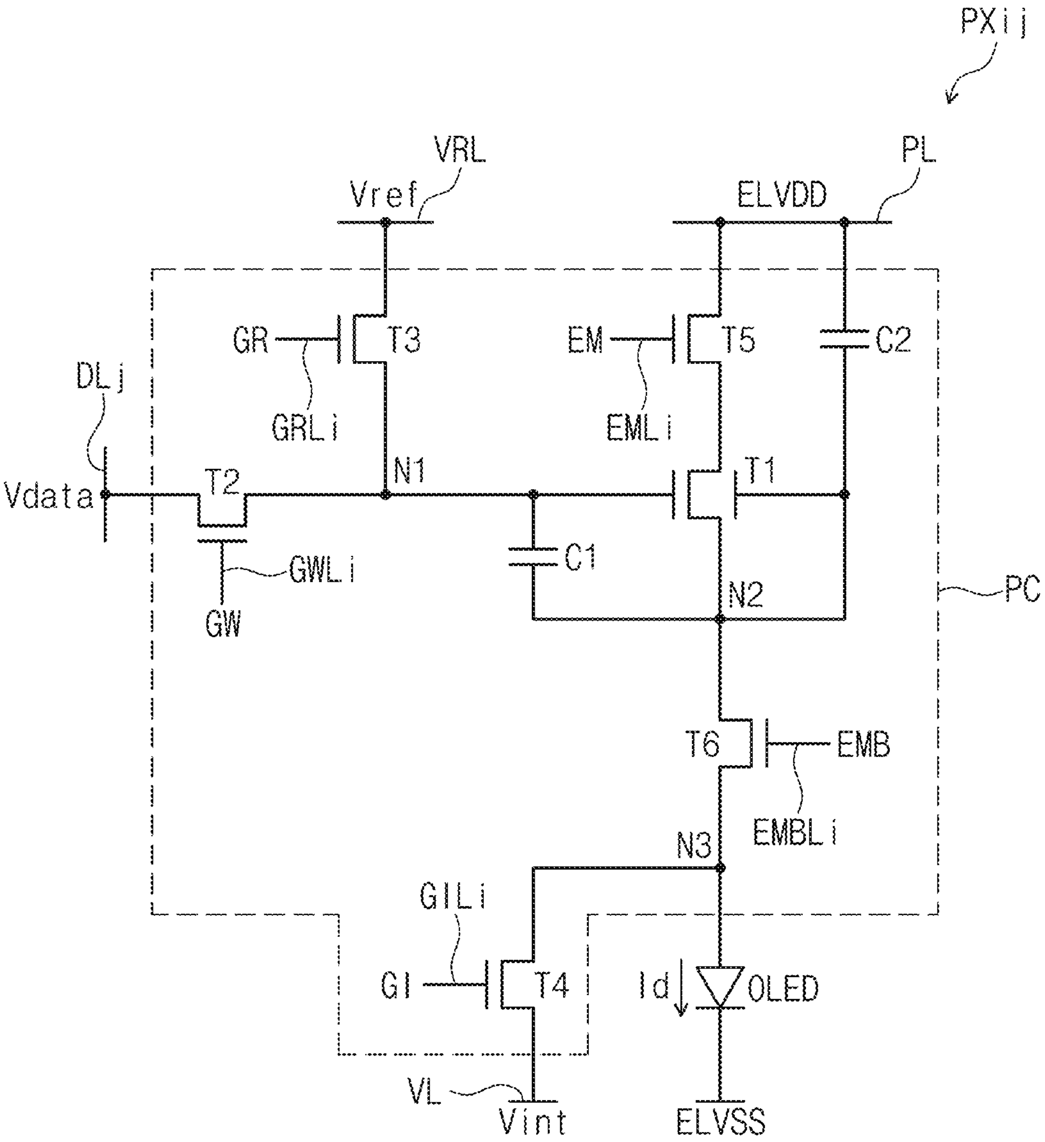
FIG. 3 is an equivalent circuit diagram of a pixel according to an embodiment of the present disclosure.

FIG. 3 is an equivalent circuit diagram of a pixel according to an embodiment of the present disclosure. The pixel PXij illustrated in FIG. 3 may correspond to each of the plurality of pixels PX11 to PXnm illustrated in FIG. 2.

Referring to FIG. 3, the pixel PXij may be connected to a j-th data line DLj among the data lines DL1 to DLm, an i-th first scan line GWLi among the first scan lines GWL1 to GWLn, an i-th second scan line GILi among the second scan lines GIL1 to GILn, an i-th third scan line GRLi among the third scan lines GRL1 to GRLn, an i-th first emission line EMLi among the first emission lines EML1 to EMLn, and an i-th second emission line EMBLi among the second emission lines EMBL1 to EMBLn. In this case, 'i' and 'j' are natural numbers.

The pixel PXij may be connected to the first scan line GWLi for transmitting a first scan signal GW, the second scan line GILi for transmitting a second scan signal GI, the third scan line GRLi for transmitting the third scan signal GR, the first emission line EMLi transmitting a first emission control signal EM, a second emission line EMBLi for transmitting the second emission control signal EMB, and a data line DLj for transmitting a data voltage Vdata. In addition, the pixel PXij may be connected to the first voltage line PL for transmitting the first driving voltage ELVDD, the second voltage line VL for transmitting the initialization voltage Vint, and the third voltage line VRL for transmitting the reference voltage Vref.

The pixel PXij may include a light emitting diode OLED and a pixel driving circuit PC. For example, the light emitting diode OLED may be an organic light emitting diode including an organic light emitting layer. The pixel driving circuit PC may be connected to the light emitting diode OLED to control the amount of current flowing through the light emitting diode OLED. The light emitting diode OLED may generate light with specific brightness depending on the amount of current provided.

The pixel driving circuit PC may include first to sixth transistors T1, T2, T3, T4, T5, and T6, a first capacitor C1, and a second capacitor C2. The first electrode (first terminal) of each of the first to sixth transistors T1 to T6 may be a source or a drain, and the second electrode (second terminal) of each of the first to sixth transistors T1 to T6 may be an electrode different from the first electrode. For example, when the first electrode is a drain, the second electrode may be a source. A node connected to the gate electrode of the first transistor T1 may be a first node N1, and a node connected to the second electrode of the first transistor T1 may be defined as a second node N2. A node connected to an anode AE (see FIG. 4) of the light emitting diode OLED may be a third node N3.

The pixel PXij according to an embodiment of the present disclosure may be referred to as having a 6T2C structure.

Each of the first to sixth transistors T1, T2, T3, T4, T5, and T6 may be an N-type transistor with an oxide semiconductor as a semiconductor layer. However, this is provided for the illustrative purposes only. For example, the semiconductor layer according to an embodiment of the present disclosure is not limited to this composition and may include amorphous silicon, low-temperature polycrystalline silicon (LTPS), or crystalline silicon. N-type transistors for the first to sixth transistors T1, T2, T3, T4, T5, and T6 may exhibit less variation in device characteristics and have a lower probability of instantaneous afterimage generation. However, this is also for the illustrative purposes only. For example, all the first to sixth transistor T7 T1, T2, T3, T4, T5, and T6 may be P-type transistors. In another embodiment, at least one of the first to sixth transistors T1, T2, T3, T4, T5, and T6 is an N-type transistor, with the remaining transistors being P-type transistors.

The first transistor T1 may be electrically connected between the first voltage line PL and the second node N2. The first transistor T1 may include a first gate electrode connected to the first node N1, a first electrode electrically connected to the first voltage line PL for receiving the first driving voltage ELVDD, and a second electrode connected to the second node N2. The first electrode may be connected to the first voltage line PL via the fifth transistor T5. The second electrode may be connected to the third node N3 via the sixth transistor T6. The first transistor T1 may further include a second gate electrode connected to the second node N2. The first gate electrode and the second gate electrode may face each other at different layers. The first transistor T1 may receive the data voltage Vdata depending on the switching operation of the second transistor T2 and may control the amount of a driving current Id flowing through the light emitting diode OLED. The first transistor T1 may be referred to as a driving transistor.

The second transistor T2 may be connected between the data line DLj and the first node N1. The second transistor T2 may include a gate electrode connected to the first scan line GWLi for receiving the first scan signal GW, a first electrode connected to the data line DLj, and a second electrode connected to the first node N1. The second transistor T2 may be turned on in response to the first scan signal GW to electrically connect the data line DLj to the first node N1, transmitting the data voltage Vdata from the data line DLj to the first node N1. The second transistor T2 may be referred to as a switching transistor.

The third transistor T3 may be connected between the first gate electrode of the first transistor T1 and the third voltage line VRL. The third transistor T3 may include a gate electrode connected to the third scan line GRLi for receiving the third scan signal GR, a first electrode connected to the third voltage line VRL for receiving the reference voltage Vref, and a second electrode connected to the first node N1. The third transistor T3 may be turned on in response to the third scan signal GR received through the third scan line GRLi to transmit the reference voltage Vref form the third voltage line VRL to the first node N1. The third transistor T3 may be referred to as a reset transistor.

The fourth transistor T4 may be connected between the second voltage line VL and the third node N3. The fourth transistor T4 may include a gate electrode connected to the second scan line GILi for providing the second scan signal GI, a first electrode connected to the third node N3, and a second electrode connected to the second voltage line VL for providing the initialization voltage Vint. The fourth transistor T4 may be turned on in response to the second scan signal GI received through the second scan line GILi to transmit the initialization voltage Vint from the second voltage line VL to the third node N3. The fourth transistor T4 may be referred to as an initialization transistor.

The fifth transistor T5 may be connected between the first voltage line PL and the first transistor T1. The fifth transistor T5 may include a gate electrode connected to the first emission line EMLi for providing the first emission control signal EM, a first electrode connected to the first voltage line PL, and a second electrode connected to the first electrode of the first transistor T1. The fifth transistor T5 may be turned on or turned off in response to the first emission control signal EM received through the first emission line EMLi. The fifth transistor T5 may be referred to as a first light emitting transistor.

The sixth transistor T6 may be connected between the first transistor T1 and the light emitting diode OLED. The sixth transistor T6 may include a gate electrode connected to the second emission line EMBLi for providing the second emission control signal EMB, a first electrode connected to the second node N2, and a second electrode connected to the third node N3. The sixth transistor T6 may be turned on or turned off in response to the second emission control signal EMB received through the second emission line EMBLi. The sixth transistor T6 may be referred to as a second light emitting transistor.

The first capacitor C1 may be connected between the first node N1 and the second node N2. The first capacitor C1 may include a first electrode and a second electrode. The first electrode may be connected to the first gate electrode of the first transistor T1, and the second electrode may be connected to the second electrode of the first transistor T1. The first capacitor C1 may store a threshold voltage and a voltage corresponding to the data signal. The first capacitor C1 may be referred to as a storage capacitor.

The second capacitor C2 may be connected between the first voltage line PL and the second node N2. The second capacitor C2 may include a first electrode and a second electrode. The first electrode may be connected to the first voltage line PL. The second electrode may be connected to the second gate electrode and the second electrode of the first transistor T1. The capacitance of the second capacitor C2 may be smaller than that of the first capacitor C1. The second capacitor C2 may be referred to as a hold capacitor.

The light emitting diode OLED may be electrically connected to the first transistor T1. The light emitting diode OLED may include the anode AE (see FIG. 4) connected to the third node N3 and a cathode CE (see FIG. 4) facing the pixel electrode. The cathode CE (see FIG. 4) may receive the second driving voltage ELVSS. The cathode CE (see FIG. 4) may be a common electrode shared by the plurality of pixels PX (see FIG. 2).

Figure 4:
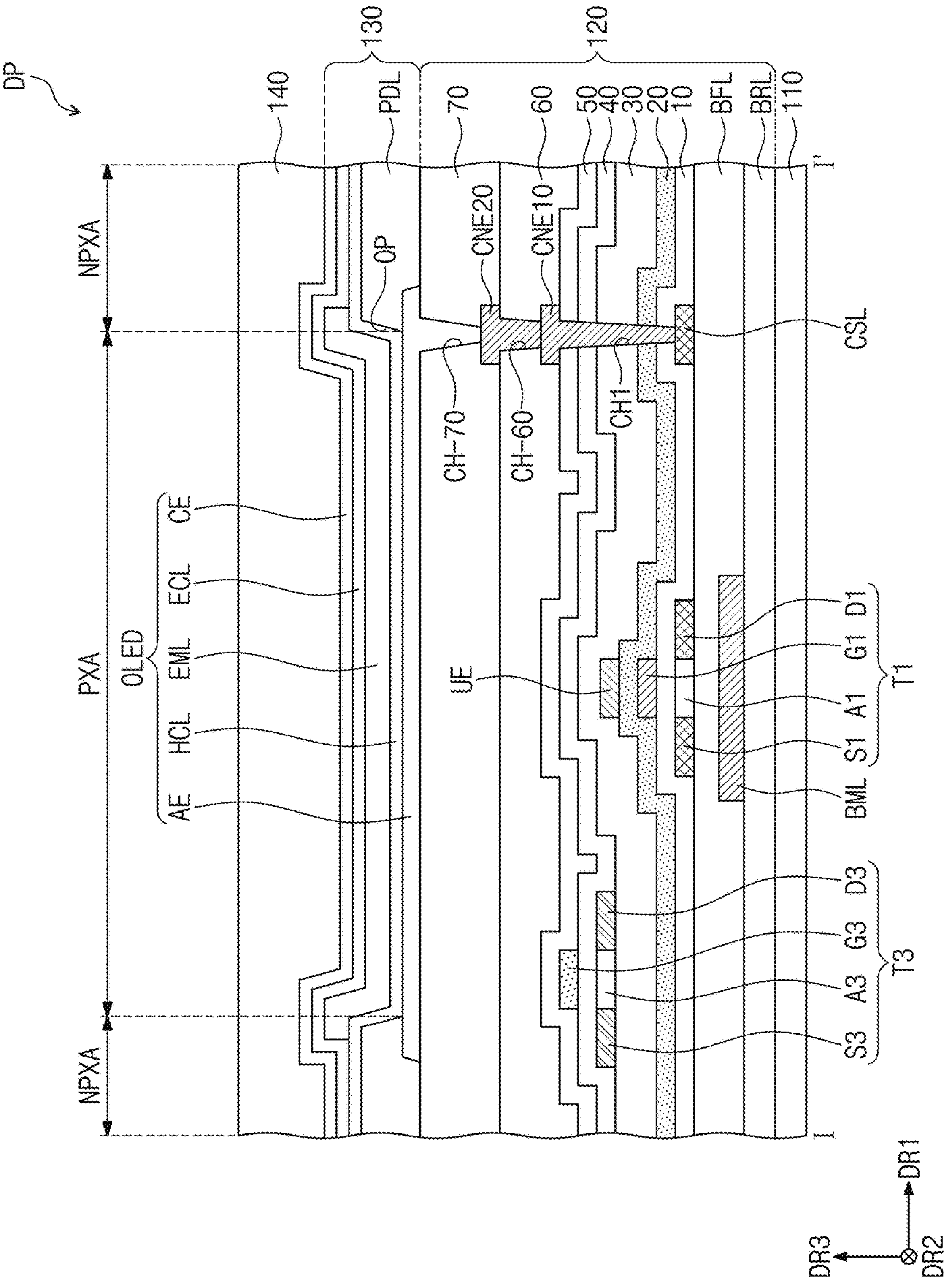
FIG. 4 is a cross-sectional view illustrating a display panel taken along line I-I' of FIG. 1 according to an embodiment of the present disclosure.

FIG. 4 is a cross-sectional view illustrating a display panel taken along line I-I' of FIG. 1 according to an embodiment of the present disclosure.

Referring to FIG. 4, the display panel DP may include a base layer 110, a circuit layer 120 disposed on the base layer 110, a light emitting element layer 130, and an encapsulation layer 140.

The base layer 110 may have a synthetic resin layer. The synthetic resin layer may include a thermosetting resin. In particular, the synthetic resin layer may be a polyimide-based resin layer, and the material is not particularly limited. The synthetic resin layer may include at least one of an acrylic resin, a methacrylic resin, a polyisoprene resin, a vinyl resin, an epoxy resin, a urethane resin, a cellulose resin, a siloxane resin, a polyamide resin, or a perylene resin. In addition, the base layer may include a glass substrate, a metal substrate, or an organic/inorganic composite material substrate.

At least one inorganic layer may be disposed on a top surface of the base layer 110. The inorganic layer may include at least one of an aluminum oxide, a titanium oxide, a silicon oxide, a silicon oxynitride, a zirconium oxide, or a hafnium oxide. The inorganic layer may have a multiple-layer structure. The inorganic layer in the multiple-layer structure may include a barrier layer BRL and/or, a buffer layer BFL to be described later. The barrier layer BRL and the buffer layer BFL may be selectively disposed.

The barrier layer BRL prevents foreign substances from infiltrating from the outside. The barrier layer BRL may include a silicon oxide layer and a silicon nitride layer. The silicon oxide layer may include a plurality of silicon oxide layers, the silicon nitride layer may include a plurality of silicon nitride layers, and the silicon oxide layers and the silicon nitride layers may be alternately stacked.

A blocking pattern BML may be disposed on the barrier layer BRL. According to an embodiment, the barrier layer BRL may be omitted. In this case, the blocking pattern BML may be provided on the top surface of the base layer 110.

The blocking pattern BML may overlap with the first transistor T1. The blocking pattern BML may overlap with a channel part A1 to prevent the channel part A1 from being degraded in electrical characteristics. In addition, during the fabricating process of the display device DD, the blocking pattern BML may protect the first transistor T1 from light or moisture introduced from a lower portion of the base layer 110. The blocking pattern BML may include a material having a lower light transmittance. For example, the blocking pattern BML may be a metal pattern including molybdenum (Mo). The light incident onto the blocking pattern BML may be reflected from the top surface or the bottom surface of the blocking pattern BML.

Although FIG. 4 illustrates the blocking pattern BML disposed under the first transistor T1, the placement relationship of the blocking pattern BML according to an embodiment of the present disclosure is not limited to this configuration. For example, the blocking pattern BML may be disposed under at least one of the plurality of transistors including the first transistor T1 and the third transistor T3, to overlap with the channel part of the transistor.

The buffer layer BFL may be disposed on the barrier layer BRL while covering the blocking pattern BML. The buffer layer BFL may improve a coupling force between the base layer 110 and the semiconductor pattern and/or the conductive pattern. The barrier layer BRL may include a silicon oxide layer and a silicon nitride layer. The silicon oxide layer and the silicon nitride layer may be alternately stacked.

A semiconductor pattern is disposed on the buffer layer BFL. Hereinafter, a semiconductor pattern directly disposed on the buffer layer BFL is described as a first semiconductor pattern. The first semiconductor pattern may include an oxide semiconductor.

The first semiconductor pattern may have electrical properties that vary depending on the doping state. The first semiconductor pattern may include a doping region and a non-doping region. The doping region may be doped with an N-type dopant or a P-type dopant. A transistor in the P type may include a doping region doped with the P-type dopant, and a transistor in the N type may include a doping region doped with the N-type dopant.

The doping region may have greater conductivity than the non-doping region, and may serve as an electrode or a signal line. The non-doping region substantially corresponds to an active (or channel) region of the transistor. In other words, a first portion of the first semiconductor pattern may be an active region of a transistor, a second portion of the first semiconductor pattern may be a source region or a drain region of the transistor, and a third portion of the first semiconductor pattern may be a connection electrode or a connection signal line. FIG. 4 illustrates the first transistor T1 as an example of the first semiconductor pattern.

A first electrode S1, a channel part A1, and a second electrode D1 of the first transistor T1 may be formed from the first semiconductor pattern. The first electrode S1 and the second electrode D1 of the first transistor T1 may extend from the channel part A1 in opposite directions.

FIG. 4 illustrates a portion of a connection signal line CSL formed from the semiconductor pattern. Although not separately illustrated, the connection signal line CSL may be connected to a second electrode of the sixth transistor T6 (see FIG. 3), when viewed in a plan view.

A first insulating layer 10 is disposed on the buffer layer BFL. The first insulating layer 10 may overlap with the pixels PX (see FIG. 2) to cover the first semiconductor pattern. The first insulating layer 10 may be an inorganic layer and/or an organic layer, and may have a single-layer structure or a multiple-layer structure. The first insulating layer 10 may include at least one of an aluminum oxide, a titanium oxide, a silicon oxide, a silicon oxynitride, a zirconium oxide, or a hafnium oxide. According to an embodiment, the first insulating layer 10 may be a single silicon oxide layer. An insulating layer of the circuit layer 120, which is to be described later, in addition to the first insulating layer 10, may be an inorganic layer and/or an organic layer, and may have a single-layer structure or a multiple-layer structure. The inorganic layer may include at least one of the above-described materials.

A third electrode G1 of the first transistor T1 is disposed on the first insulating layer 10. The third electrode G1 may be a portion of a metal pattern. The third electrode G1 of the first transistor T1 may overlap with the channel part A1 of the first transistor T1. In the process of doping the first semiconductor pattern, the third electrode G1 of the first transistor T1 may serve as a mask. The third electrode G1 may be the first gate electrode of the first transistor T1.

A second insulating layer 20 is disposed on the first insulating layer 10 to cover the third electrode G1. The second insulating layer 20 may overlap with the plurality of pixels PX. The second insulating layer 20 may be an inorganic layer and/or an organic layer, and may have a single-layer structure or a multiple-layer structure. According to an embodiment, the second insulating layer 20 may be a single silicon oxide layer.

An upper electrode UE may be disposed on the second insulating layer 20. The upper electrode UE may overlap with the third electrode G1. The upper electrode UE may be a portion of a metal pattern or a portion of a doped semiconductor pattern. A portion of the third electrode G1 and the upper electrode UE overlapped with the portion of the third electrode G1 may be the second gate electrode of the first transistor T1.

According to an embodiment of the present disclosure, the second insulating layer 20 may be substituted with an insulating pattern. The upper electrode UE is disposed on the insulating pattern. The upper electrode UE may serve as a mask for forming the insulating pattern from the second insulating layer 20.

A third insulating layer 30 is disposed on the second insulating layer 20 to cover the upper electrode UE. According to an embodiment, the third insulating layer 30 may be a single silicon oxide layer. A semiconductor pattern is disposed on the third insulating layer 30. Hereinafter, a semiconductor pattern directly disposed on the third insulating layer 30 may be a second semiconductor pattern.

The second semiconductor pattern may include an oxide semiconductor. FIG. 4 illustrates the third transistor T3 by way of example of the second semiconductor pattern. A first electrode S3, a channel part A3, and a second electrode D3 of the third transistor T3 are formed from the second semiconductor pattern. The first electrode S3 and the second electrode D3 of the third transistor T3 may extend from the channel part A3 in opposite directions.

A fourth insulating layer 40 is disposed on the third insulating layer 30 to cover the second semiconductor pattern. According to an embodiment, the fourth insulating layer 40 may be a single silicon oxide layer. A third electrode G3 of the third transistor T3 is disposed on the third insulating layer 30. The third electrode G3 may be a portion of the metal pattern. The third electrode G3 of the third transistor T3 is overlapped with the channel part A3 of the third transistor T3. The third electrode G3 may be a gate electrode of the third transistor T3.

According to an embodiment of the present disclosure, the fourth insulating layer 40 may be substituted with an insulating pattern. The third electrode G3 of the third transistor T3 is disposed on the third insulating pattern. According to an embodiment, the third electrode G3 may have the same shape as that of the insulating pattern, when viewed in a plan view.

A fifth insulating layer 50 is disposed on the fourth insulating layer 40 to cover the third electrode G3. According to an embodiment, the fifth insulating layer 50 may include a silicon oxide layer and a silicon nitride layer. The fifth insulating layer 50 may include a plurality of silicon oxynitride layers and silicon nitride layers alternately stacked one another.

At least one insulating layer is further disposed on the fifth insulating layer 50. According to an embodiment, the sixth insulating layer 60 and a seventh insulating layer 70 may be disposed on the fifth insulating layer 50. The sixth insulating layer 60 and the seventh insulating layer 70 may be organic layers and may have a single-layer structure or a multiple-layer structure. The sixth insulating layer 60 and the seventh insulating layer 70 may be a single-layered polyimide-based resin layer. The present disclosure is not limited thereto, the sixth insulating layer 60 and the seventh insulating layer 70 may include at least one of acrylic resin, methacrylic resin, polyisoprene, vinyl resin, epoxy resin, urethane resin, cellulose resin, siloxane resin, polyamide resin, or perylene resin.

A first connection electrode CNE10 may be disposed on the fifth insulating layer 50. The first connection electrode CNE10 may be connected to the connection signal line CSL through a first contact hole CH1 formed through the first to fifth insulating layers 10 to 50, and a second connection electrode CNE20 may be connected to the first connection electrode CNE10 through a contact hole CH-60 formed through the sixth insulating layer 60. According to an embodiment of the present disclosure, at least one of the fifth insulating layer 50 or the sixth insulating layer 60 may be omitted.

The light emitting element layer 130 includes the light emitting diode OLED and a pixel defining layer PDL. The anode AE of the light emitting diode OLED may be disposed on the seventh insulating layer 70. The anode AE of the light emitting diode OLED may be connected to the second connection electrode CNE20 through a contact hole CH-70 formed through the seventh insulating layer 70. The light emitting diode OLED may include an organic light emitting diode.

An opening OP of the pixel defining layer PDL may expose at least a portion of the anode AE of the light emitting diode OLED. The opening OP of the pixel defining layer PDL may define a light emitting region PXA. For example, the plurality of pixels PX (see FIG. 2) may be arranged in a uniform pattern, when viewed in a plan view of the display panel DP. The area containing the plurality of pixels PX may be a pixel region, with each pixel region including the light emitting region PXA and a non-light emitting region NPXA adjacent to the light emitting region PXA. The non-light emitting region NPXA may surround the light emitting region PXA.

A hole control layer HCL may be commonly disposed in both the light emitting region PXA and the non-light emitting region NPXA. A common layer, such as the hole control layer HCL, may be formed across the plurality of pixels PX (see FIG. 2). The hole control layer HCL may include a hole transport layer and a hole injection layer.

A light emitting layer EML is disposed on the hole control layer HCL. The light emitting layer EML may be disposed only in a region corresponding to the opening OP. The light emitting layer EML may be separately formed on each of the plurality of pixels PX (see FIG. 2).

Although the patterned light emitting layer EML is illustrated according to an embodiment, the light emitting layer EML may also be commonly disposed across the plurality of pixels PX (see FIG). In this case, the light emitting layer EML may generate white light or blue light and may have a multiple-layer structure.

An electron control layer ECL is disposed on the light emitting layer EML. The electron control layer ECL may include an electron transport layer and an electron injection layer. The cathode CE of the light emitting diode OLED is disposed on the electron control layer ECL. The electron control layer ECL and the cathode CE may be commonly disposed across the plurality of pixels PX.

The encapsulation layer 140 is disposed on the cathode CE. The encapsulation layer 140 may cover the plurality of pixels PX (see FIG. 2). According to an embodiment, the encapsulation layer 140 may directly cover the cathode CE. In other words, the encapsulation layer 140 may be in direct contact with the cathode CE. According to an embodiment of the present disclosure, the display layer 100 may further include a capping layer directly covering the cathode CE. According to an embodiment of the present disclosure, the stack structure of the light emitting diode OLED may have an inverted structure compared to the structure illustrated in FIG. 4.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, while the organic layer may protect the light emitting element layer 130 from foreign materials such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer, but the present disclosure is not limited thereto.

Figure 5:
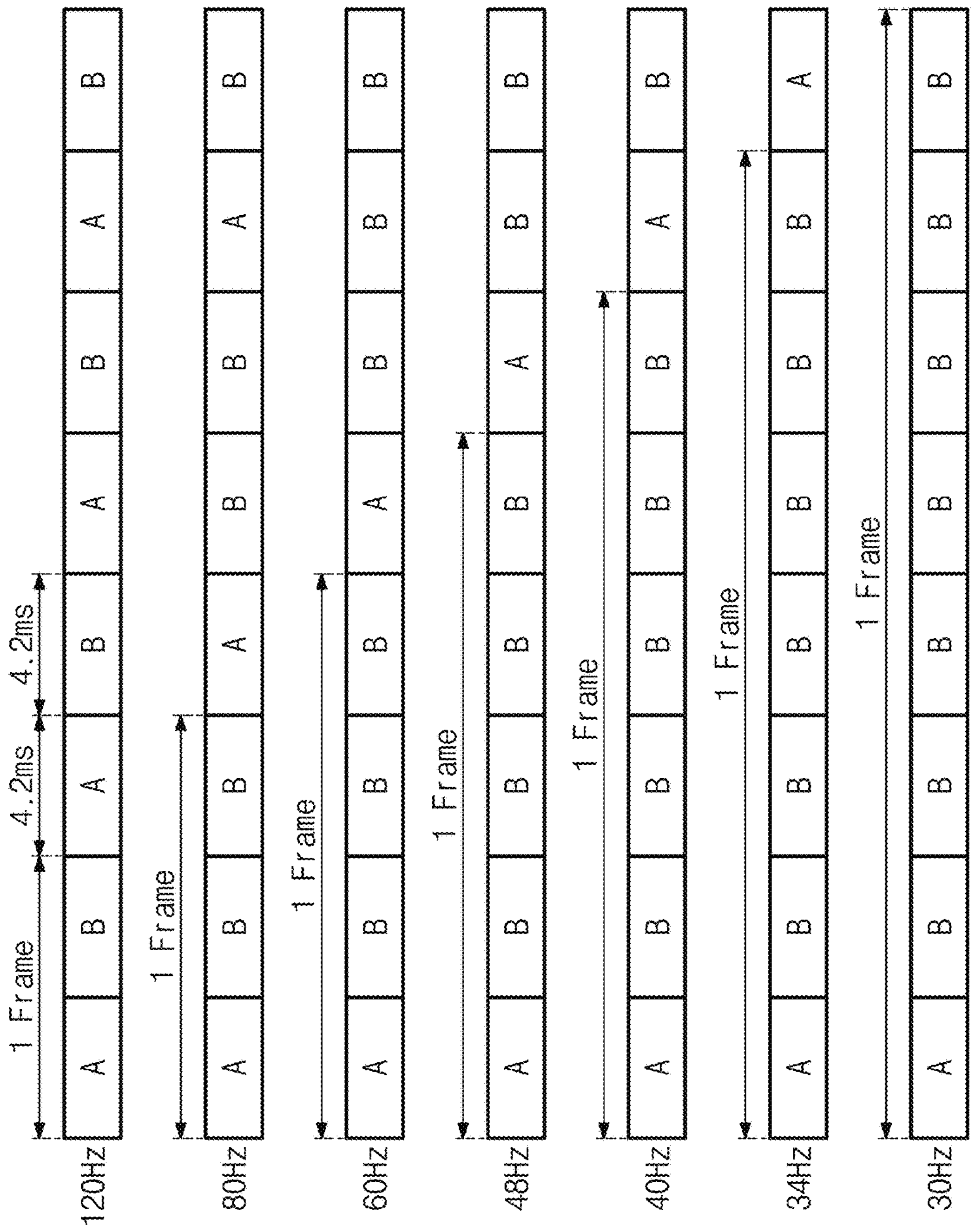
FIG. 5 illustrates driving frequencies resulting from a driving operation of a display device according to an embodiment of the present disclosure.

FIG. 5 illustrates driving frequencies resulting from a driving operation of a display device according to an embodiment of the present disclosure.

Referring to FIGS. 2, 3, and 5, the driving controller DC may drive the plurality of pixels PX in units of a frame. One frame may include a driving period 'A' and a scan period 'B'.

The driving period 'A' and the scan period 'B' may be referred to as a first period and a second period, respectively. The first period may be a period for performing data writing, while the second period may be a period during which the refresh of the data writing is not performed.

During the driving period 'A', the data voltage Vdata of the first transistor T1 may be initialized. The initialization and update speed of the data voltage Vdata may be controlled depending on the situation, preventing deterioration of the first transistor T1 and the light emitting diode OLED by changing the period of the driving period 'A'. For example, when displaying a still image where the data voltage Vdata does not need to be updated quickly, low-speed driving may be performed to reduce power consumption by extending the frame period of the first transistor T1.

During low-speed driving, the length of the period of the first frame may increase. Accordingly, the number of scan periods 'B' in which the input data voltage Vdata is maintained may increase. During the scan period 'B', the driving current Id may be supplied to the light emitting diode OLED while the first emission control signal EM is maintained in the turned-on state.

The driving controller DC may adjust the driving frequency of the display panel DP by repeating the scan period 'B'.

The display device DD may synchronize frame generation by a graphic processing device, which is included in the display device DD, with the frame output timing of the display panel DP. In other words, the display panel DP may operate at a variable scan rate. For example, when the operating frequency of the display panel DP is lowered under specific operating conditions, such as displaying, still image, the power consumption of the display device DD may be reduced.

Each of the driving period 'A' and the scan period 'B' may be a period having a time of 2.1 milliseconds (ms). In other words, each of the driving period 'A' and the scan period 'B' may have a frequency of 240 Hz (Hertz). However, this is provided for illustrative purposes only, and the duration of each of the driving period 'A' and the scan period 'B' according to an embodiment of the present disclosure is not limited to these examples. For example, each of the driving period 'A' and the scan period 'B' may be a period having a time of 4.2 ms.

When the graphic processing device generates a frame with a scan rate of 120 Hz, the scan driving circuit SDC may control the driving period 'A' and the scan period 'B' to be driven once per frame, enabling the display panel DP to operate at a frequency of 120 Hz. A plurality of driving periods 'A' and a plurality of scan periods 'B' may be provided, respectively. The plurality of driving periods 'A' and the plurality of scan periods 'B' may be alternately provided.

When the graphic processing device generates a frame with a scan rate of 80 Hz, the scan driving circuit SDC may be driven to have one driving period 'A' and two scan periods 'B' in one frame.

When the graphic processing device generates a frame with a scan rate of 60 Hz, the scan driving circuit SDC may be driven to have one driving period 'A' and three scan periods 'B' in one frame.

When the graphic processing device generates a frame with a scan rate of 48 Hz, the scan driving circuit SDC may be driven to have one driving period 'A' and four scan periods 'B' in one frame.

When the graphic processing device generates a frame with a scan rate of 40 Hz, the scan driving circuit SDC may be driven to have one driving period 'A' and five scan periods 'B' in one frame.

When the graphic processing device generates a frame with a scan rate of 34 Hz, the scan driving circuit SDC may be driven to have one driving period 'A' and six scan periods 'B' in one frame.

When the graphic processing device generates a frame with a scan rate of 30 Hz, the scan driving circuit SDC may be driven to have one driving period 'A' and seven scan periods 'B' in one frame.

Figure 6:
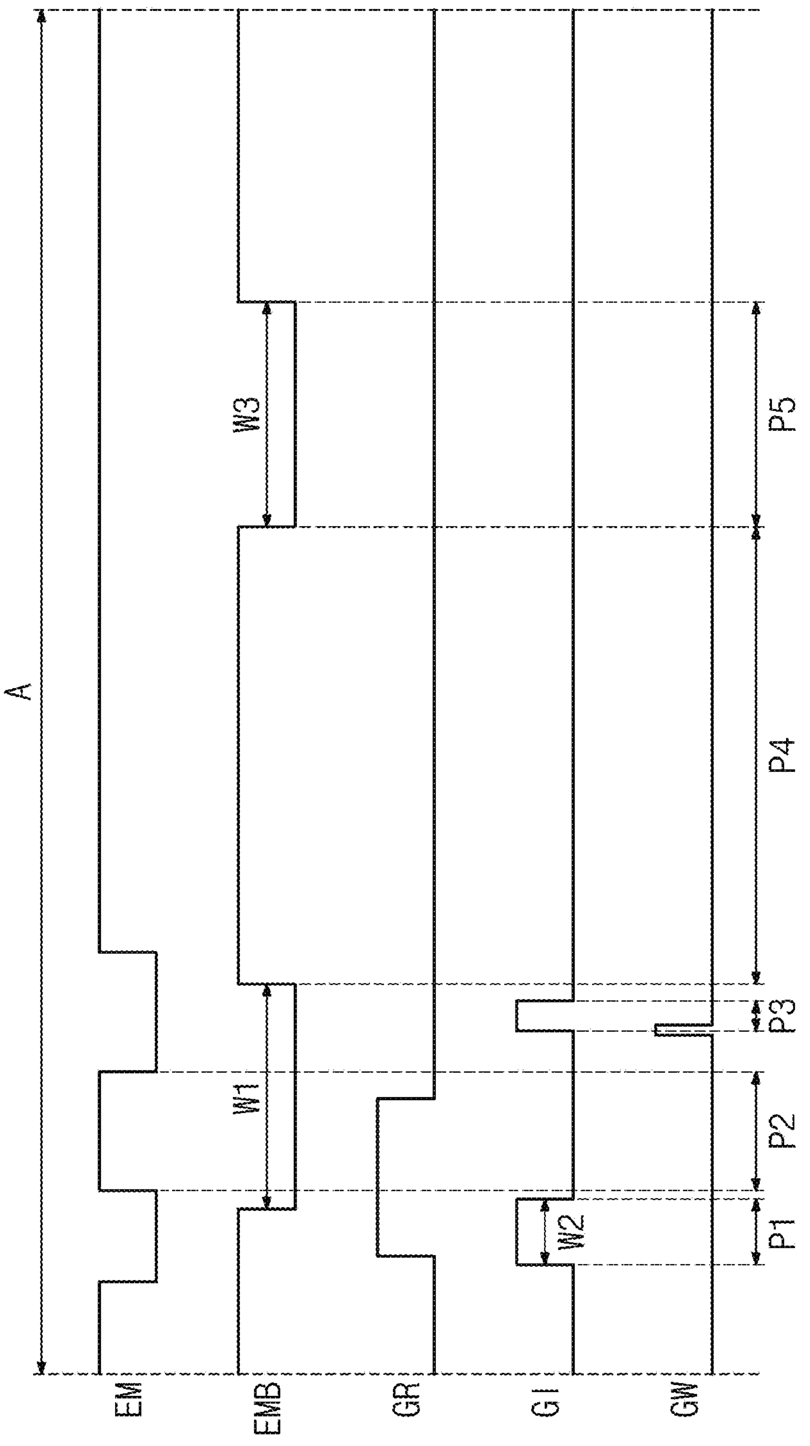
FIG. 6 is a waveform diagram of driving signals during a driving period according to an embodiment of the present disclosure.

FIG. 6 is a waveform diagram of driving signals during a driving period according to an embodiment of the present disclosure.

Referring to FIGS. 3 and 6, each of the driving signals EM, EMB, GR, GI, and GW may have a high level for some periods and a low level for some periods. N-type transistors, with gates electrically connected to the signal lines GRLi, GILi, and GWLi and emission lines EMLi and EMBLi, may be turned on when a relevant signal is at a high level, and P-type transistors may be turned on when a relevant signal is at a low level.

The driving period 'A' may include a first period P1, a second period P2, a third period P3, a fourth period P4, and a fifth period P5.

During the first period P1, the second scan signal GI in an active state may be provided to the second scan line GILT. The third scan signal GR in an active state may be provided to the third scan line GRLi. The first scan signal GW may be in a non-active state.

The fourth transistor T4 may be turned on by the second scan signal GI. The third node N3, which is the anode AE (see FIG. 4) of the light emitting diode OLED, may be initialized with the initialization voltage Vint by the fourth transistor T4 when it is turned on.

The third transistor T3 may be turned on by the third scan signal GR. The first node N1, which is the first gate electrode of the first transistor T1, may be initialized with the reference voltage Vref by the third transistor T3 when it is turned on.

The second period P2 may be performed after the first period P1. During the second period P2, the third scan signal GR in an active state may be provided to the third scan line GRLi. The first emission control signal EM in an active state may be provided to the first emission line EMLi. Each of the first scan signal GW, the second scan signal GI, and the second emission control signal EMB may be in a non-active state.

The third transistor T3 may be turned on by the third scan signal GR. The first node N1, which is the first gate electrode of the first transistor T1, may be initialized with the reference voltage Vref by the third transistor T3 when it is turned-on.

The fifth transistor T5 may be turned on by the first emission control signal EM. The first driving voltage ELVDD may be provided to the first electrode of the first transistor T1 by the fifth transistor T5 when it is turned-on.

The reference voltage Vref may be provided to the first gate electrode of the first transistor T1, and the first driving voltage ELVDD may be supplied to the first electrode of the first transistor T1 to turn it on. When the voltage of the second electrode of the first transistor T1 decreases to less than the difference 'Vref-Vth' between the reference voltage Vref and the threshold voltage Vth of the first transistor T1, the first transistor T1 may turn off. In addition, a voltage corresponding to the threshold voltage Vth of the first transistor T1 may be stored in the first capacitor C1 to compensate for the threshold voltage Vth of the first transistor T1.

The third period P3 may be performed after the second period P2. During the third period P3, the first scan signal GW in an active state may be provided to the first scan line GWLi. The second scan signal GI in an active state may be provided to the second scan line GILi. The third scan signal GR, the first emission control signal EM, and the second emission control signal EMB may be in a non-active state.

The second transistor T2 may be turned on by the first scan signal GW. The data voltage Vdata may be transferred from the data line DLj to the first node N1, which is the first gate electrode of the first transistor T1, by the second transistor T2 when it is turned on. Accordingly, the voltage of the first node N1 may change from the reference voltage Vref to a voltage corresponding to the data voltage Vdata. In this case, the voltage of the second node N2 may also change in response to the variation in voltage across the first node N1. The voltage at the second node N2 may be represented as 'Vref−Vth+aX(Vdata−Vref)', which varies depending on the capacitance ratio a=C1/(C1+C2) of the first capacitor C1 and the second capacitor C2. Accordingly, the gate-source voltage Vgs (the voltage between the first node N1 and the second node N2) of the first transistor T1 may be as illustrated in Equation 1 below.

$$Vgs = (1 - a) \times (Vdata - Vref) + Vth = \left\{\left(\frac{C2}{C1 + C2}\right)\right\}(Vdata - Vref) + Vth \quad \text{Equation 1}$$

The fourth transistor T4 may be turned on by the second scan signal GI. The third node N3, which is the anode AE (see FIG. 4) of the light emitting diode OLED, may be initialized with the initialization voltage Vint by the fourth transistor T4 when it is turned on. In this case, the gate-source voltage Vgs of the first transistor T1 may be as illustrated in Equation 2 below.

$$Vgs = \left\{\left(\frac{C2}{C1 + C2}\right)\right\}(Vdata - Vef) + Vth - Vint \quad \text{Equation 2}$$

Unlike the present disclosure, a change in brightness may occur due to a residual voltage in the light emitting diode OLED. In the case of low gray scale driving, the visibility of this change in brightness may increase. Consequently, the light emitting diode OLED displaying black in the black gray scale may emit light with brightness higher than the intended black brightness. However, according to the present disclosure, the phenomenon of the light emitting diode OLED emitting light slowly when in the black gray scale can be prevented by initializing the anode AE (see FIG. 4) before the light emitting diode OLED emits light, using the initialization voltage Vint through the fourth transistor T4. Accordingly, changes in brightness of the light emitting diode OLED at low gray scales may be minimized, thereby further improving display quality. Consequently, the pixel driving circuit PC that prevents the degradation of display quality and the display device DD (see FIG. 1) including the same may be provided.

The fourth period P4 may be performed after the third period P3. During the fourth period P4, the first emission control signal EM in an active state may be provided to the first emission line EMLi. The second emission control signal EMB in an active state may be provided to the second emission line EMBLi. The first scan signal GW, the second scan signal GI, and the third scan signal GR may be in a non-active state.

The fifth transistor T5 may be turned on by the first emission control signal EM. The sixth transistor T6 may be turned on by the second emission control signal EMB.

When the fifth transistor T5 and the sixth transistor T6 are turned on, a current path may be formed along the first voltage line PL through the fifth transistor T5, the first transistor T1, the sixth transistor T6, and the light emitting diode OLED. In other words, the driving current Id may flow through the first voltage line PL, the fifth transistor T5, the first transistor T1, the sixth transistor T6, and the light emitting diode OLED.

The data voltage Vdata output from the data driving circuit DDC (see FIG. 2) of the display panel DP (see FIG. 2) is written, enabling the light emitting diode OLED to emit light. The driving current Id may be expressed by the following equations.

$$Id = \frac{1}{2} \cdot \mu \cdot Cox \cdot \frac{W}{L}(Vgs - Vth)^2 \quad \text{Equation 3}$$

$$\alpha = \frac{1}{2} \cdot \mu \cdot Cox \cdot \frac{W}{L} \quad \text{Equation 4}$$

$$Id = \alpha\left(\left\{\left(\frac{C2}{C1 + C2}\right)\right\}(Vdata - Vref) + Vth - Vint - Vth\right)^2 \quad \text{Equation 5}$$

$$Id = \alpha\left\{\left(\frac{C2}{C1 + C2}\right)\right\}(Vdata - Vref - Vint)^2 \quad \text{Equation 6}$$

In the above equations, 'k' represents electric field mobility, 'Cox' denotes the capacitance of a gate insulating layer, 'W' and 'L' are the width and length of the first transistor T1, and 'Vgs' is the gate-source voltage of the first transistor T1. 'k' and 'Cox' are constants. In other words, 'a' is a constant. The gate-source voltage of the first transistor T1 is the voltage difference obtained by subtracting the voltage across the second node N2 from the voltage across the third node N3.

Equation 5 is a summary of Equations 2 to 4. Equation 6 is a summary of Equation 5.

The threshold voltage Vth of the first transistor T1 included in each of the plurality of pixels PX (refer to FIG. 2) may vary depending on the characteristics of the first transistor T1. However, according to the present disclosure, the threshold voltage Vth of the first transistor T1 does not affect the driving current Id flowing through the light emitting diode OLED during the first to fourth periods P1, P2, P3, and P4. Referring to Equation 6, the driving current Id flowing through the light emitting diode OLED during the fourth period P4 is not affected by the threshold voltage Vth of the first transistor T1. The light emitting diode OLED is proportional to the square of the difference between the data voltage Vdata, the reference voltage Vref, and the initialization voltage Vint, regardless of the characteristics of the first transistor T1. Consequently, the brightness of the image IM (refer to FIG. 1) output from the display panel DP (refer to FIG. 2) is uniformly maintained. Accordingly, the pixel driving circuit PC with improved display quality and the display device DD (refer to FIG. 1) including the same may be provided.

The fifth period P5 may be performed after the fourth period P4. During the fifth period P5, the first emission control signal EM may be in an active state. The first scan signal GW, the second scan signal GI, and the third scan signal GR may be in a non-active state. The second emission control signal EMB may be in a non-active state.

A width W3 of a non-active period of the second emission control signal EMB during the fifth period P5 may be the same as a width W1 of the non-active period of the second emission control signal EMB during a portion of the first period P1 as well as the second and third periods P2 and P3. When the second emission control signal EMB is in an active state, a current path may be formed along the first voltage line PL, the fifth transistor T5, the first transistor T1, the sixth transistor T6, and the light emitting diode OLED. Accordingly, the driving current Id may be applied to the light emitting diode OLED. The driving current Id may be controlled and applied by the second emission control signal EMB during the fifth period P5.

Unlike the present disclosure, when the first emission control signal EM is toggled and the second emission control signal EMB is maintained in an active state, in other words, when the driving current Id is controlled by the first emission control signal EM, the first transistor T1 may operate whenever the first emission control signal EM is activated, thereby increasing power consumption. However, according to the present disclosure, the first emission control signal EM may not be toggled during the scan period B. The fifth transistor T5 may always be turned on during the scan period B. Consequently, the fifth transistor T5, the first transistor T1, and the second node N2 may remain electrically connected. Accordingly, the pixel driving circuit PC with reduced power consumption and the display device DD (see FIG. 1) including the same may be provided.

Figure 7:
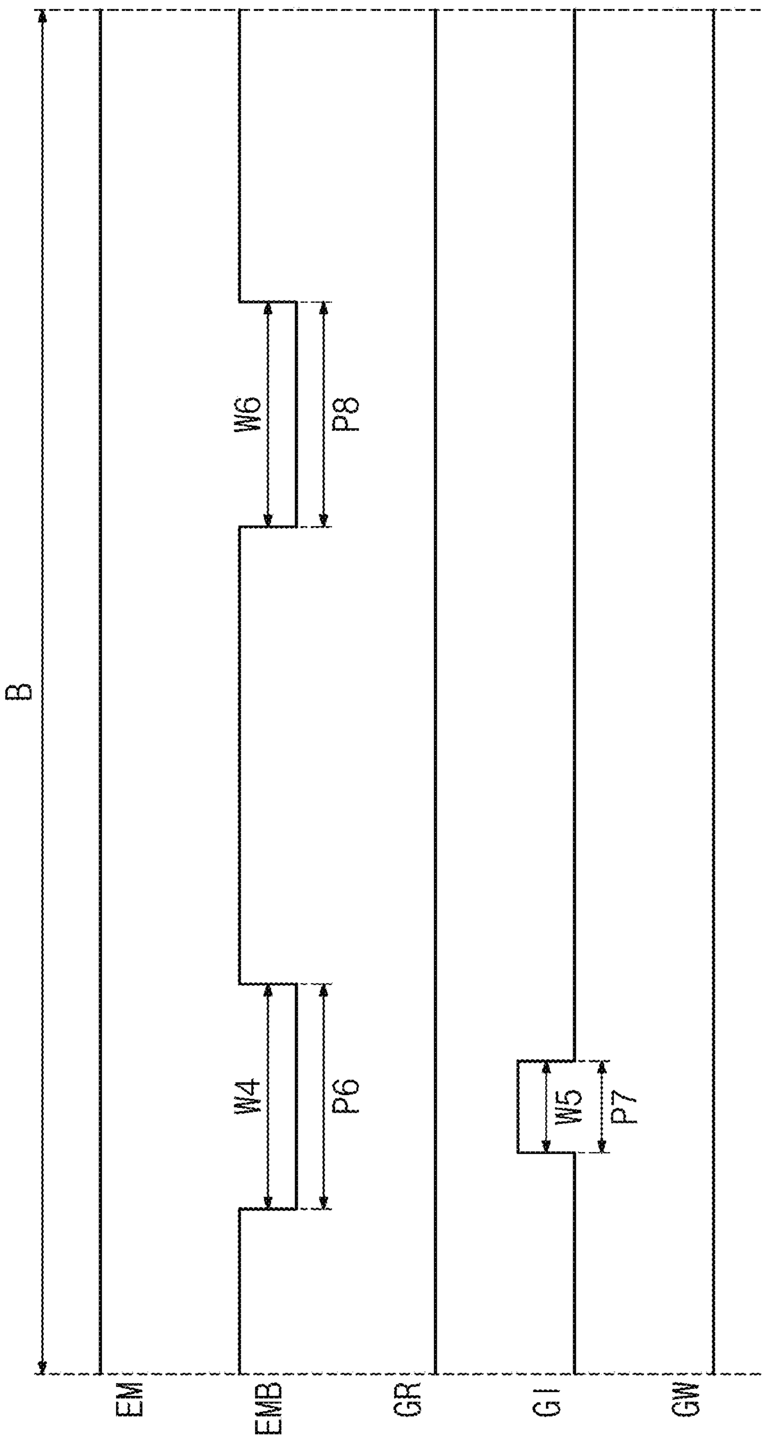
FIG. 7 is a waveform diagram of driving signals during a scan period according to an embodiment of the present disclosure.

FIG. 7 is a waveform diagram of driving signals during a scan period according to an embodiment of the present disclosure.

Referring to FIGS. 3 and 7, the first emission control signal EM may be in an active state during the scan period 'B'. The first scan signal GW and the third scan signal GR may be in a non-active state.

The second emission control signal EMB may include an active period and a non-active period. The scan period 'B' may include a sixth period P6. The sixth period P6 may be the non-active period P6 of the second emission control signal EMB.

A width W4 of the non-active period P6 of the second emission control signal EMB may be the equal to the width W1 of the non-active period of the second emission control signal EMB during the driving period 'A' (see FIG. 6) and the width W3 of the non-active period of the second emission control signal EMB during the driving period 'A' (see FIG. 6).

When the second emission control signal EMB is in an active state, a current path may be formed along the first voltage line PL, the fifth transistor T5, the first transistor T1, the sixth transistor T6, and the light emitting diode OLED. Accordingly, the driving current Id may be applied to the light emitting diode OLED. In other words, in the scan period B, the supply of the driving current Id may be controlled and applied by the second emission control signal EMB.

During the scan period 'B', the first emission control signal EM may be maintained in an active state.

Unlike the present disclosure, when the first emission control signal EM is toggled and the second emission control signal EMB is maintained in an active state, in other words, when the application of the driving current Id is controlled by the first emission control signal EM, the first transistor T1 may operate whenever the first emission control signal EM is activated, thereby increasing power consumption. However, according to the present disclosure, the first emission control signal EM may not be toggled during the scan period B. The fifth transistor T5 may always be turned on during the scan period B. Consequently, the fifth transistor T5, the first transistor T1, and the second node N2 may remain electrically connected. Accordingly, the pixel driving circuit PC with reduced power consumption and the display device DD (see FIG. 1) including the same may be provided.

The second scan signal GI may include an active period and a non-active period. The scan period 'B' may further include a seventh period P7. The seventh period P7 may be the active period P7 of the second scan signal GI.

A width W5 of the active period P7 of the second scan signal GI may be less than the width W4 of the non-active period P6 of the second emission control signal EMB.

The width W5 of the active period P7 of the second scan signal GI may be different from a width W2 of the active period P1 of the second scan signal GI during the driving period 'A' (see FIG. 6). For example, the width W5 of the active period P7 of the second scan signal GI may be greater than the width W2 of the active period P1 of the second scan signal GI during the driving period 'A' (see FIG. 6).

The scan period 'B' may further include an eighth period P8. The eighth period P8 may be the non-active period P8 of the second emission control signal EMB.

A width W6 of the non-active period P8 of the second emission control signal EMB may be equal to the width W1 of the non-active period of the second emission control signal EMB in the driving period 'A' (see FIG. 6). In other words, the eighth period P8 may be substantially equal to the fifth period P5 of the driving period 'A' (see FIG. 6).

The non-active period P6 of the second emission control signal EMB may overlap with the active period P7 of the second scan signal GI. The active period P7 of the second scan signal GI may be overlapped with the non-active period P6 of the second emission control signal EMB. In other words, the active period of the second emission control signal EMB does not overlap with the active period P7 of the second scan signal GI. Accordingly, the fourth transistor T4 and the sixth transistor T6 may not be simultaneously turned on during the scan period 'B'.

The active period P7 of the second scan signal GI may be referred to as an anode reset period. In other words, the scan period B may include at least one anode reset period during the low-speed driving performed at a lower frame frequency.

The fourth transistor T4 may be turned on during the active period P7 of the second scan signal GI. The initialization voltage Vint may be provided to the third node N3. In other words, the anode AE (see FIG. 4) of the light emitting diode OLED may be reset to the initialization voltage Vint.

The third node N3 may be periodically reset to the initialization voltage Vint to reduce flicker phenomena that occur as the scan period 'B' within the frame increases during low-speed driving.

Unlike the present disclosure, during the driving period 'A', the brightness may be reduced as the data voltage Vdata is initialized. When the duration of the driving period 'A' increases, a decrease in brightness may become noticeable to the user. In addition, when the driving current is low even after the driving period 'A' ends in the low grayscale state, a charging delay phenomenon may occur, increasing the time required for the data voltage Vdata to recover to its original state. This can result in a flicker phenomenon due to the recognition of decreased brightness and the charging delay. However, according to the present disclosure, an anode reset driving, in which the anode AE (see FIG. 4) of the light emitting diode OLED is periodically reset to the initialization voltage Vint, may be performed during the scan period 'B' in low-speed driving in low-grayscale. Consequently, the flicker phenomenon may be improved. Accordingly, the display device DD (see FIG. 1) with improved display quality may be provided.

Figure 8:
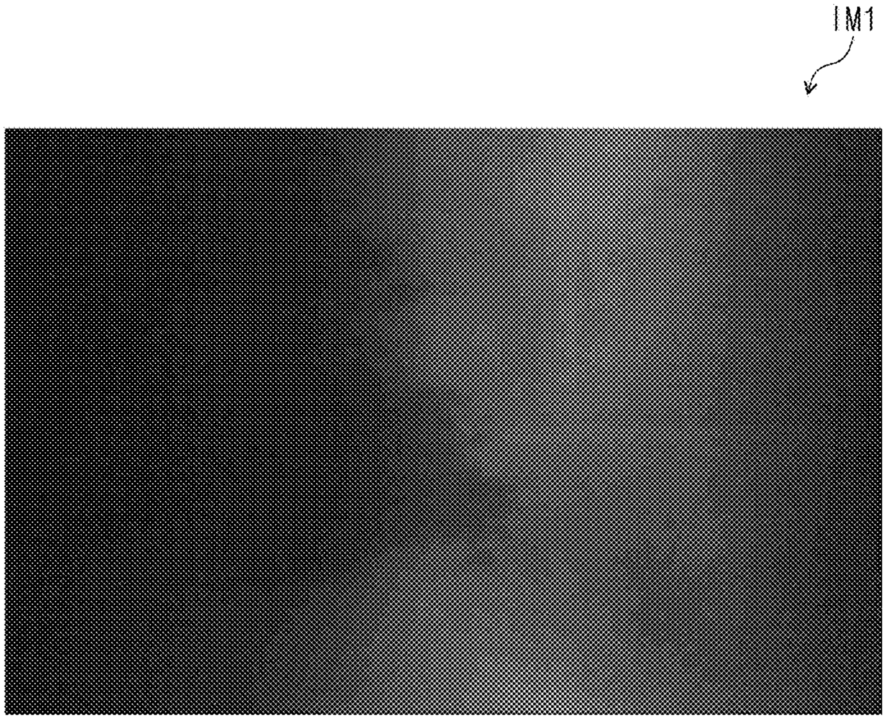
FIG. 8 is a photograph of a display panel according to a comparative example of the present disclosure.
Figure 9:
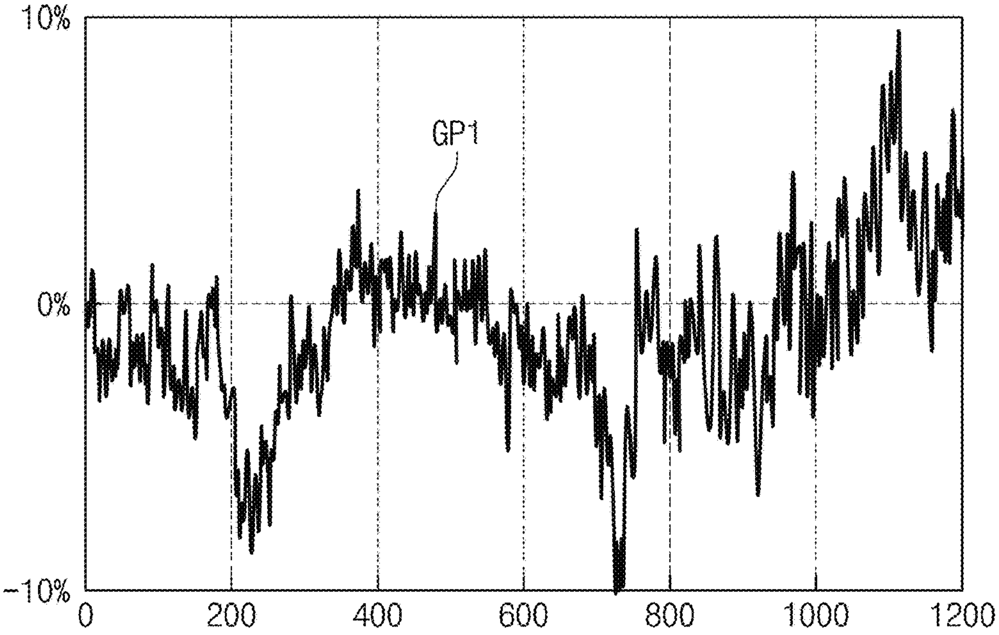
FIG. 9 is a graph measuring the brightness of a display panel according to a comparative example of the present disclosure.
Figure 10:
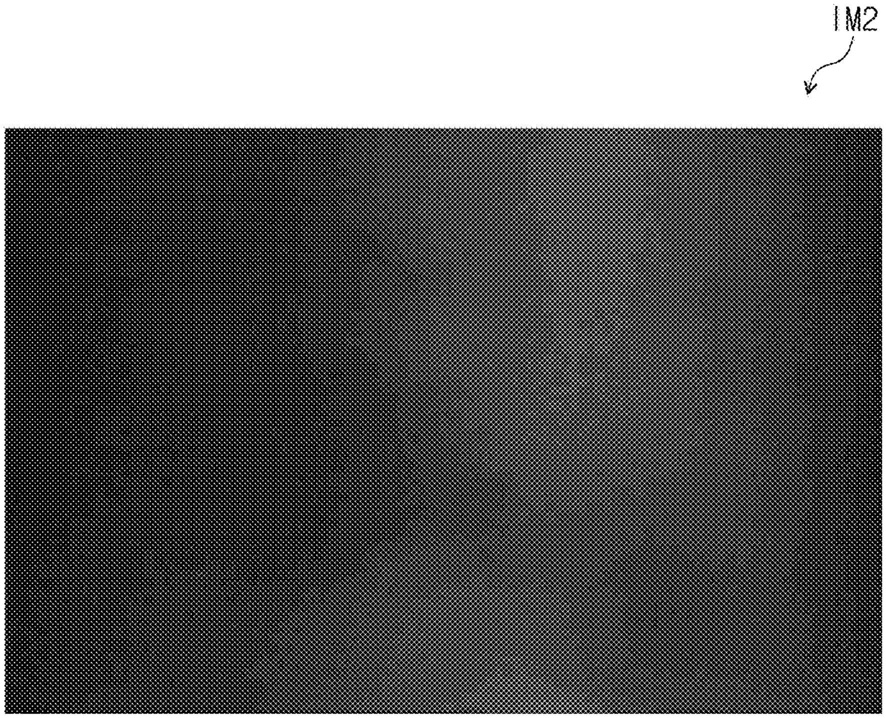
FIG. 10 is a photograph of a display panel according to an embodiment of the present disclosure.
Figure 11:
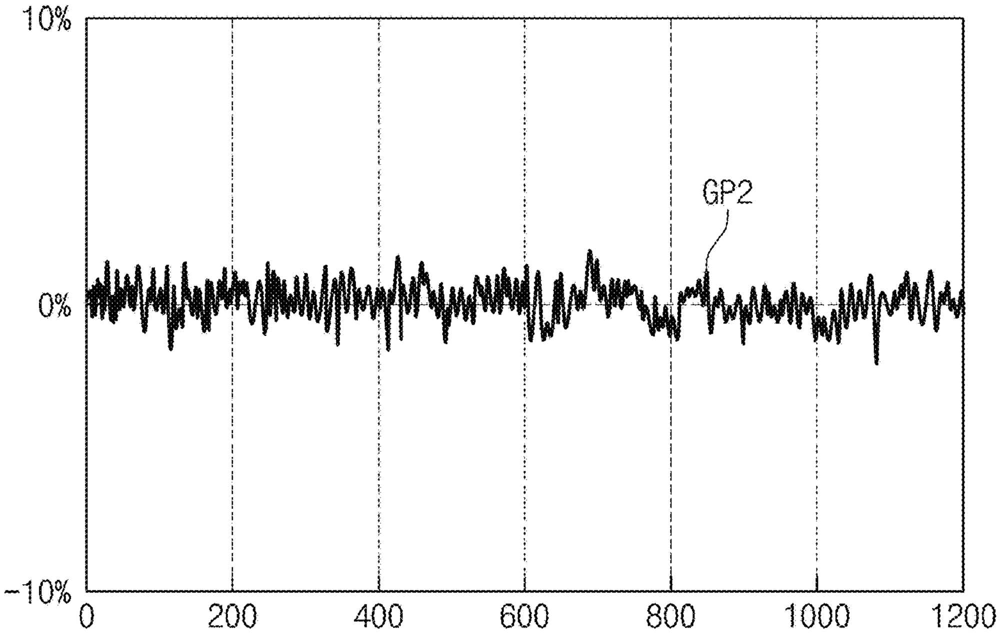
FIG. 11 is a graph measuring the brightness of a display panel according to an embodiment of the present disclosure.

FIG. 8 is a photograph of a display panel according to a comparative example of the present disclosure, FIG. 9 is a graph measuring the brightness of the display panel according to a comparative example of the present disclosure, FIG. 10 is a photograph of the display panel according to an embodiment of the present disclosure, and FIG. 11 is a graph measuring the brightness of the display panel according to an embodiment of the present disclosure.

As illustrated in FIGS. 9 and 11, the horizontal axis represents the vertical axis coordinates of the images IM1 and IM2 of FIGS. 8 and 10 in the range of 0 to 1200, respectively, and the vertical axis represents the brightness profile in the range of −10% to 10%.

Referring to FIGS. 8 and 10, the images IM1 and IM2 may be obtained by photographing the display panel DP using an external photographing unit. Each of the images IM1 and IM2 is obtained by photographing the display panel DP displaying a black screen when a data voltage Di corresponds to the 255 grayscale level and when the data voltage Di provided to the pixel PXij corresponds to 10 nits.

Referring to FIGS. 3, 8, and 9, the first image IM1 may be obtained by driving and measuring the display panel DP using an existing method for driving pixels according to a comparative example of the present disclosure. In other words, according to the comparative example, during the scan period B of the pixel PXij, the first emission control signal EM is not always in an active state, and the active period of the second emission control signal EMB may overlap with the active period of the second scan signal GI.

The fourth transistor T4 and the sixth transistor T6 may be simultaneously turned on during the scan period. Since the first capacitor C1, the second capacitor C2, and the capacitor of the light emitting diode OLED are all discharged during this period, the amount of current flowing to the second voltage line VL to apply the initialization voltage Vint may increase. Accordingly, a voltage drop (referred to as IR Drop) may occur at the first driving voltage ELVDD of the first voltage line PL connected to the second capacitor C2. A voltage level of the first driving voltage ELVDD may change due to the voltage drop phenomenon in the first voltage line PL. Consequently, a Mura defect, manifesting as horizontal or vertical lines on the display panel due to insufficient driving current, may occur in the display panel of comparative example.

A first graph GP1 may represent a brightness profile for each vertical axis coordinate of the first image IM1. The brightness profile may be an average value of brightness during the period corresponding to the vertical axis coordinate in the first image IM1.

Referring to the vicinity of 220 and 730 on the horizontal axis in the first graph GP1, an average brightness value close to −10% is observed. This indicates that a brightness deviation has occurred in that area. Consequently, a line-stained Mura defect may be caused in the display panel DP (see FIG. 2) using the pixel driving method according to the comparative example.

Additionally, when the display panel DP (see FIG. 2) is driven using the pixel driving method according to the comparative example, the first emission control signal EM toggles repeatedly during the scan period. Consequently, the power consumption of the display panel DP (see FIG. 2) may increase. For example, the pixel driving method according to the comparative example may result in power consumption ranging from 0.90 W (watt) to 1 W.

However, referring to FIGS. 3, 8, 10, and 11, the second image IM2 may be obtained by driving the display panel DP through the method of driving the pixel PXij according to an embodiment of the present disclosure and measuring the display panel DP. In other words, during the scan period B of the pixel PXij, the first emission control signal EM is always in the active state, and the active period of the second emission control signal EMB may not overlap with the active period of the second scan signal GI. In other words, the non-active period of the second emission control signal EMB may cover the active period of the second scan signal GI. For example, the non-active period of the second emission control signal EMB may occur at the same time as the active period of the second scan signal GI.

According to the present disclosure, the fourth transistor T4 and the sixth transistor T6 may be driven so that they are not simultaneously turned on during the scan period ‘B’. A current path may not be defined along the first voltage line PL, the second capacitor C2, the second node N2, the sixth transistor T6, the third node N3, the fourth transistor T4, and the second voltage line VL. Accordingly, a voltage drop phenomenon of the first driving voltage ELVDD may be prevented or removed, and the Mura defect may be prevented or removed. Consequently, the pixel driving circuit PC that prevents the deterioration of display quality, the display device DD (see FIG. 1) including the same, and a method for driving the display device DD may be provided.

A second graph GP2 may represent a brightness profile for each vertical axis coordinate of the second image IM2. The brightness profile may be an average value of brightness during the period corresponding to the vertical axis coordinate in the second image IM2.

According to the present disclosure, the brightness deviation in the second graph GP2 may be less than that in the first graph GP1 (see FIG. 9). Accordingly, the pixel driving circuit PC with improved display quality compared to the comparative example, the display device DD including the same (see FIG. 1), and the method for driving the display device DD may be provided.

In addition, according to the present disclosure, the first emission control signal EM may not be toggled during the scan period ‘B’. With the pixel driving method according to an embodiment of the present disclosure, power consumption may be about 0.6 W due to the scan period ‘B’. Accordingly, the pixel driving circuit PC with reduced power consumption, the display device DD including the same (see FIG. 1), and the method for operating the display device DD may be provided.

As described above, the third transistor and the fourth transistor may be driven to prevent them from being turned on simultaneously. The current path may not be defined through the first voltage line, the second capacitor, the fourth transistor, the third transistor, and the second voltage line. Accordingly, the voltage drop of the first driving voltage may be prevented or removed, and the Mura defect may be prevented or removed. Consequently, the pixel driving circuit that prevents the display quality from being degraded, the display device including the pixel driving circuit, and the method for driving the display device may be provided.

While the present disclosure has been described with reference to certain embodiments, it will be apparent to those of ordinary skill in the art that various changes and modifications can be made without departing from the spirit and scope of the present disclosure as set forth in the following claims.

What is claimed is:

1. A display device comprising:
- a display panel including a plurality of pixels;
- a driving controller configured to drive the plurality of pixels in units of a frame,
- wherein each of the plurality of pixels includes:
- a light emitting diode and a pixel driving circuit connected to the light emitting diode,
- wherein the pixel driving circuit includes:
- a first transistor including a gate electrode connected to a first node, a first electrode electrically connected to a first voltage line for applying a first driving voltage, and a second electrode connected to a second node;
- a second transistor including a gate electrode connected to a first scan line for applying a first scan signal, a first electrode connected to a data line, and a second electrode connected to the first node;

a first capacitor connected between the first node and the second node;

a sixth transistor including a gate electrode connected to a second emission line for applying a second emission control signal, a first electrode connected to the second node, and a second electrode connected to a third node;

a fourth transistor including a gate electrode connected to a second scan line for applying a second scan signal different from the first scan signal, a first electrode connected to the third node, and a second electrode connected to a second voltage line for applying an initialization voltage; and a fifth transistor including a gate electrode connected to a first emission line for applying a first emission control signal, a first electrode connected to the first voltage line, and a second electrode connected to the first electrode of the first transistor; and a third transistor including a gate electrode connected to a third scan line for applying a third scan signal different from the first scan signal and the second scan signal, a first electrode connected to a third voltage line for applying a reference voltage, and a second electrode connected to the first node, wherein the frame includes a driving period and a scan period, wherein a non-active period of the second emission control signal overlaps with an active period of the second scan signal during the scan period, and wherein the first emission control signal is in an active state during the scan period.

2. The display device of claim 1, wherein the third scan signal is in a non-active state during the scan period.

3. The display device of claim 1, wherein the driving period includes an active period of the first scan signal.

4. The display device of claim 1, wherein a first width of the active period of the second scan signal is smaller than a second width of the non-active period of the second emission control signal during the scan period.

5. The display device of claim 4, wherein the active period of the second scan signal has a third width different from the first width during the driving period.

6. The display device of claim 4, wherein the non-active period of the second emission control signal during the driving period has a fourth width equal to the second width.

7. The display device of claim 1, wherein the first scan signal is in a non-active state during the scan period.

8. The display device of claim 1, wherein the active period of the second scan signal and at least a portion of the non-active period of the second emission control signal occur at a same time during the scan period.

9. The display device of claim 1, wherein a plurality of scan periods are included in the frame.

10. A pixel driving circuit comprising:

a first transistor including a gate electrode connected to a first node, a first electrode electrically connected to a first voltage line for applying a first driving voltage, and a second electrode connected to a second node;

a second transistor including a gate electrode connected to a first scan line for applying a first scan signal, a first electrode connected to a data line, and a second electrode connected to the first node;

a first capacitor connected between the first node and the second node;

a sixth transistor including a gate electrode connected to a second emission line for applying a second emission control signal, a first electrode connected to the second node, and a second electrode connected to a third node; and a fourth transistor including a gate electrode connected to a second scan line for applying a second scan signal different from the first scan signal, a first electrode connected to the third node, and a second electrode connected to a second voltage line for applying an initialization voltage;

a fifth transistor including a gate electrode connected to a first emission line for applying a first emission control signal, a first electrode connected to the first voltage line, and a second electrode connected to the first electrode of the first transistor; and a third transistor including a gate electrode connected to a third scan line for applying a third scan signal different from the first scan signal and the second scan signal, a first electrode connected to a third voltage line for applying a reference voltage, and a second electrode connected to the first node, wherein a non-active period of the second emission control signal overlaps an active period of the second scan signal during the scan period in which a data voltage is held, and wherein the fifth transistor is in an active state during the scan period.

11. The pixel driving circuit of claim 10, wherein the third transistor is in a non-active state during the scan period.

12. The pixel driving circuit of claim 10, wherein a first width of the active period of the second scan signal is smaller than a second width of the non-active period of the second emission control signal during the scan period.

13. The pixel driving circuit of claim 10, wherein the second transistor is in a non-active state during the scan period.

14. A method for driving a display device, which includes a display panel, which includes a driving controller, a light emitting diode and a pixel driving circuit including a driving transistor, a switching transistor to receive a data voltage, an initialization transistor connected to an initialization voltage line, a first light emitting transistor, and a second light emitting transistor, the method comprising:

driving, by the driving controller, the display panel in units of a frame including a driving period and a scan period;

maintaining the first light emitting transistor in a turned on state during the scan period;

providing a first period, in which the second light emitting transistor is turned off, during the scan period;

providing a second period, in which the initialization transistor is turned on, during a period in which the second light emitting transistor is turned off, and wherein the first period overlaps an entirety of the second period.

15. The method of claim 14, further comprising:

providing a third period, in which the switching transistor is turned on, during the driving period, and allowing the light emitting diode to emit light during the driving period.

16. The method of claim 14, wherein a first width of the first period is greater than a second width of the second period.

17. The method of claim 14, wherein a plurality of driving periods and a plurality of scan periods are alternately provided.

18. The method of claim 14, further comprising:

maintaining the switching transistor in a turned off state during the scan period.

* * * * *